United States Patent [19]

Costa

[11] 4,412,720
[45] Nov. 1, 1983

[54] OPTICAL SYSTEM COUPLING A RECTANGULAR LIGHT SOURCE TO A CIRCULAR LIGHT RECEIVER

[75] Inventor: Bruno Costa, Turin, Italy

[73] Assignee: CSELT - Centro Studi e Laboratori Telecomunicazioni S.p.A., Turin, Italy

[21] Appl. No.: 256,001

[22] Filed: Apr. 21, 1981

[30] Foreign Application Priority Data

Apr. 23, 1980 [IT] Italy .................. 67634 A/80

[51] Int. Cl.³ .................................. G02B 5/14
[52] U.S. Cl. .............................. 350/96.18; 350/96.15
[58] Field of Search ................ 350/96.18, 96.15, 504, 350/505; 250/227

[56] References Cited

U.S. PATENT DOCUMENTS 3,977,764  8/1976  d'Auria et al. .................. 350/96.18
4,154,529  5/1979  Dyott ............................... 250/227

*Primary Examiner*—David K. Moore
*Attorney, Agent, or Firm*—Karl F. Ross

[57] ABSTRACT

A light source of rectangular outline, such as a semiconductor laser, is coupled to a light receiver of circular outline to be illuminated thereby, such as an end of an optical fiber, by an anamorphotic system including a pair of spherical lenses and an afocal pair of cylindrical lenses interposed in a telecentric field therebetween. When the system is used for measuring the attenuation of a fiber by the back-scattering technique, a semireflecting prism inserted between the cylindrical lenses and the fiber-side spherical lens directs part of the returning beam toward a photodetector; the effect of spurious reflections at the fiber end may be minimized by the use of a polarization-sensitive Glan prism and/or by the positioning of a flat transparent plate in front of the fiber end.

8 Claims, 3 Drawing Figures

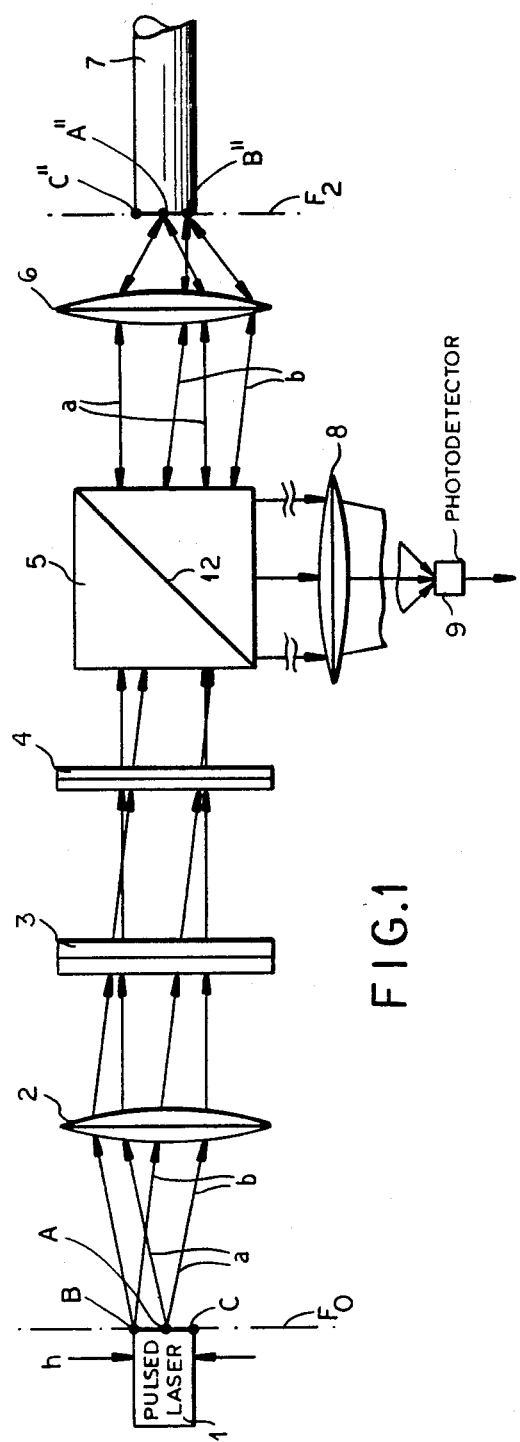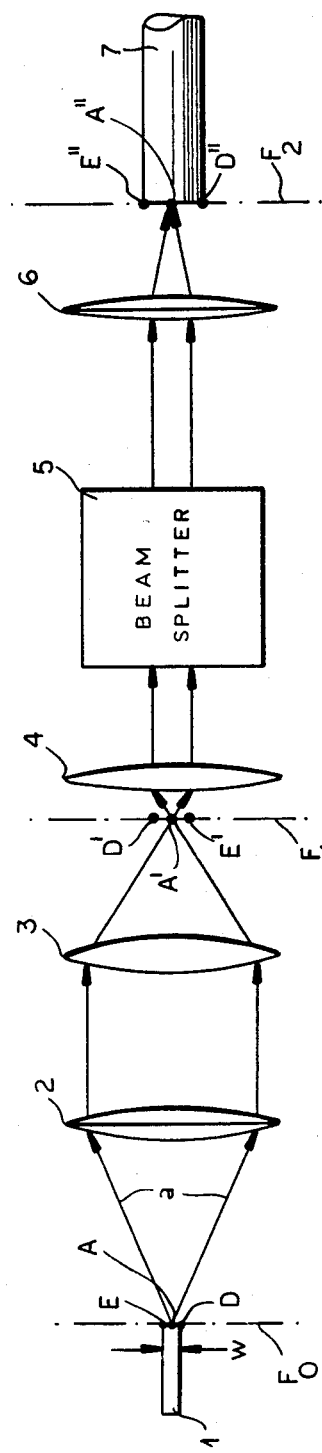

OPTICAL SYSTEM COUPLING A RECTANGULAR LIGHT SOURCE TO A CIRCULAR LIGHT RECEIVER

FIELD OF THE INVENTION

My present invention relates to an optical system, e.g. as used for evaluating the light-transmitting characteristics of optical fibers, capable of coupling a light source of substantially rectangular outline to a light receiver having a substantially circular area to be illuminated.

BACKGROUND OF THE INVENTION

In commonly owned U.S. Pat. No. 4,197,007 there has been disclosed a device for intercepting and measuring back-scattered rays from the interior of an optical fiber, illuminated by a pulsed laser, for the purpose of determining its attenuation coefficient and locating possible faults. Semiconductor lasers generally used for such evaluation, however, have rectangular emitting surfaces whose radiation can be focused by conventional systems upon a circular fiber end only with a significant loss of energy and/or with a poor utilization of the numerical aperture of the fiber. With a uniform magnification ratio in planes parallel to the major and the minor sides of the laser face, as provided by the spherical lenses of the prior patent, the image of that face projected upon the fiber end (whose diameter may be considerably smaller than the height of the laser) will either fall partly outside the fiber end or be limited to a fraction of its diameter in the transverse direction.

OBJECTS OF THE INVENTION

Thus, the general object of my present invention is to provide an optical system for fully illuminating a circular area by a rectangular light source without significant losses of luminous energy.

A more particular object is to provide a highly efficient system for the testing of optical fibers with the aid of a pulsed semiconductor laser.

It is also an object of my invention to provide means in such a system for minimizing the effect of spurious reflections at the fiber end.

SUMMARY OF THE INVENTION

An optical system according to my invention comprises an anamorphotic lens assembly with a first focal plane at the light source and with a second focal plane at the area to be illuminated, this lens assembly having a magnification ratio in a plane parallel to the minor sides of the rectangular outline of the source which exceeds its magnification ratio in a plane parallel to the major sides of that outline.

In accordance with a more particular feature of my invention, the anamorphotic lens assembly comprises positively refracting first spherical lens means focused upon the source, positively refracting second spherical lens means coaxial with the first lens means focused upon the area to be illuminated, and an afocal pair of cylindrical lenses in a field of parallel light rays existing between the first and second spherical lens means.

With the particular mode of utilization primarily envisaged, namely the testing of an optical fiber illuminated at one end in conformity with the teaching of prior U.S. Pat. No. 4,197,007, the same field of parallel light rays may accommodate semireflecting means such as a Glan-Thompson or Glan-Taylor prism with a cemented surface designed to direct back-scattered rays from the fiber to a photodetector over a path substantially perpendicular to the axis of the first and second spherical lens means.

BRIEF DESCRIPTION OF THE DRAWING

The above and other features of my invention will now be described in detail with reference to the accompanying drawing in which:

FIG. 1 is a diagrammatic view of an optical system according to my invention in a plane parallel to the major sides of a pulsed laser of rectangular outline;

FIG. 2 is a view similar to FIG. 1 but taken in a plane parallel to the minor sides of the laser outline.

SPECIFIC DESCRIPTION

Figure 3:
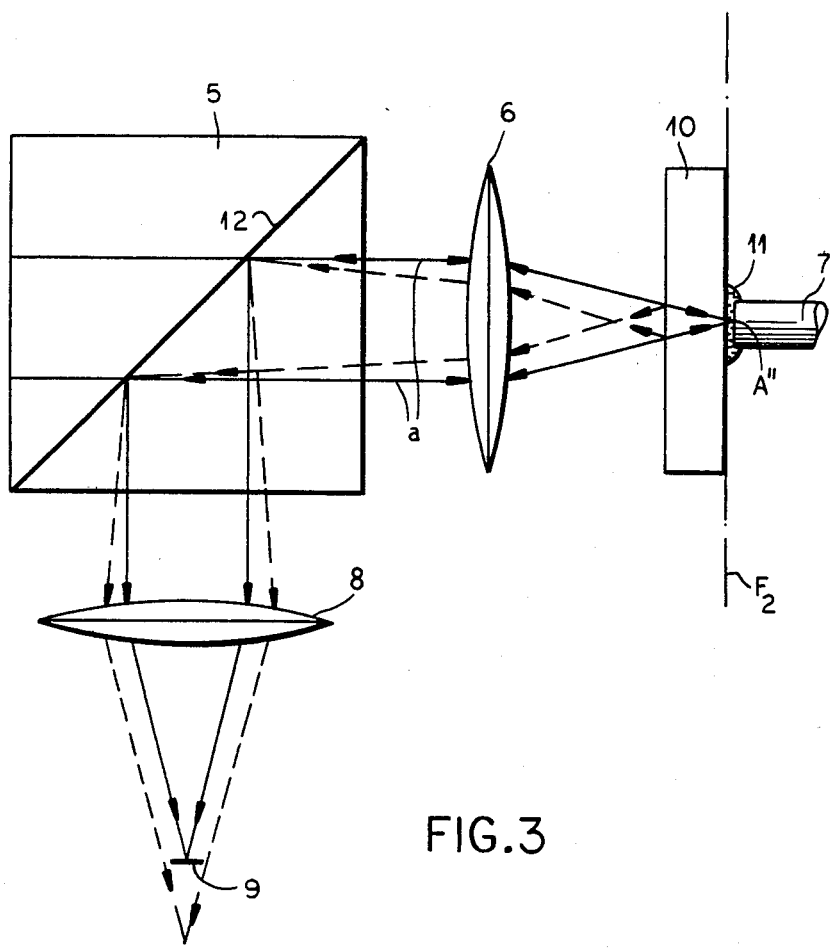
FIG. 3 is a fragmentary view taken in the plane of FIG. 1 and showing a modification.

In FIGS. 1 and 2 I have shown a pulsed light source 1, specifically a semiconductor laser, whose light-emitting face has major sides n more than twice as long as its minor sides w. This face lies in a focal plane $F_0$ of a positively refracting spherical lens 2 converting the diverging light rays from the laser into a so-called telecentric field of parallel rays. A similar collective lens 6 refocuses these parallel rays onto a plane $F_2$ located at or close to an end face of an optical fiber 7 whose light-transmitting characteristics are to be investigated.

Two cylindrical lenses 3 and 4 of different focal lengths but with a common focal plane $F_1$ are disposed as an afocal pair in the telecentric field between spherical lenses 2 and 6. The generatrices of the cylindrical lens surfaces are parallel to the height h of laser 1 so that lenses 3 and 4 do not change the angles of light rays traversing them in the plane of FIG. 1. In the plane of FIG. 2, on the other hand, these cylindrical lenses are effective to increase the magnification ratio of the spherical system comprising lenses 2 and 6.

More particularly, the magnification ratio $M'$ in the plane of FIG. 1 is given by $f_6/f_2$ where $f_6$ and $f_2$ are the focal lengths of lenses 6 and 2, respectively; in the assembly actually illustrated, lens 6 has the shorter focal length to reduce the distance between image points $B''$ and $C''$ to less than the distance between corresponding points B and C located along the minor edges of source 1. This ratio $M'$ should be so chosen as not to increase the angular beam width beyond the acceptance angle of the fiber. FIG. 1 particularly illustrates the paths a and b of light rays emitted by a midpoint A of the laser face, located on the optical axis of lenses 2 and 6, and by its edge point B.

In FIG. 2 the rays a emitted at point A have also been traced. A linear image $A'$ of this point is formed in plane $F_1$ along with similar images $D'$ and $E'$ of points D and E located along the major sides of the laser. Final images of these latter points appear at $D''$ and $E''$ in plane $F_2$. It will be noted that their spacing substantially corresponds to the fiber diameter and to the distance between points $B''$ and $C''$ in FIG. 1. This is due to the increased magnification ratio $M''$ in the plane of FIG. 2 which is given by $f_3 \cdot f_6 / f_2 \cdot f_4$. The ratio $M''/M'$ ought to be so chosen that the angular width of the resulting beam is close to but does not exceed the acceptance angle of the fiber in both planes.

It will be apparent that a similar result could be obtained by increasing the focal length $f_4$ of lens 4 over the focal length $f_3$ of lens 3 and turning these two cylindrical lenses through 90° so as to make them optically effective in the plane of FIG. 1 instead of the plane of FIG. 2. The resulting reduction in magnification ratios M' and M" could be compensated by increasing the focal-length ratio $f_6/f_2$.

A beam splitter 5 in the form of a prism with a semireflecting cemented surface 12 is inserted in the telecentric field between lenses 4 and 6. Surface 12 is inclined at a suitable angle to the axis of lenses 2 and 6 (ray path A-A") whereby back-scattered light rays from the interior of fiber 7 are directed via a focusing lens 8 onto a photodetector 9 and a nonillustrated evaluator substantially in the manner described in prior U.S. Pat No. 4,197,007. Prism 5 is preferably of the polarization-sensitive Glan type passing light rays polarized in one direction while reflecting those polarized at right angles thereto. Since the rays emitted by a semiconductor laser are predominantly polarized in the direction of its width w, a major part thereof (e.g. about 75%) will pass through surface 12 to reach the fiber 7. The back-scattered rays, on the other hand, will be depolarized so that about 50% thereof will be reflected by the prism 5 toward photodetector 9. Light reflected at the fiber end, however, will substantially maintain its original polarization and will therefore be reflected only to a minor extent by surface 12 so that spurious output pulses due to such reflection will be greatly attenuated. A further reduction of the effect of these spurious reflections can be achieved by immersing the fiber end in a refractive-index-matching liquid as described in the above-identified prior patent.

Alternatively, as illustrated in FIG. 3, I may place a flat plate 10 of glass or other transparent material in front of the illuminated end face of fiber 7 with interposition of a thin film of index-matching liquid 11 between the fiber face and the plate. This will prevent reflections at the fiber end, i.e. in the focal plane $F_2$ of lens 6, and will let such reflections occur only at the front surface of plate 10 as indicated in dotted lines. Since that front surface is well spaced from focal plane $F_2$, the rays so reflected will not be focused by lens 8 onto photodetector 9 but will largely bypass the latter. The use of such a transparent plate is preferable to that of a plate with an antireflective coating not only for reasons of economy but also since its defocusing effect is independent of wavelength.

It is to be understood that any or all of the lenses shown in the drawing could be replaced by lens groups of the proper refractivity, e.g. by microscope objectives in the case of spherical lenses 2, 6 and 8.

I claim:

1. An optical system for illuminating a substantially circular area of a light receiver by light from a source of substantially rectangular outline,
    comprising an anamorphotic lens assembly with a first focal plane at said source and with a second focal plane at said area, said lens assembly having a magnification ratio in a plane parallel to the minor sides of said outline exceeding its magnification ratio in a plane parallel to the major sides of said outline;
    said lens assembly comprising positively refracting first spherical lens means focused upon said source, positively refracting second spherical lens means coaxial with said first spherical lens means focused upon said area, and an afocal pair of cylindrical lenses in a field of parallel light rays existing between said first and second spherical lens means.

2. An optical system as defined in claim 1 wherein said cylindrical lenses include a first positive lens of larger focal length closer to said first spherical lens means and a second positive lens of smaller focal length closer to said second spherical lens means, said cylindrical lenses having generatrices parallel to said major sides.

3. An optical system as defined in claim 1 or 2 wherein said area is an end face of an optical fiber to be tested for attenuation by measuring the intensity of back-scattered light rays, further comprising semireflecting means interposed in said field of parallel light rays between said cylindrical lenses and said second spherical lens means for directing back-scattered rays from said fiber to a photodetector over a path substantially perpendicular to the axis of said first and second spherical lens means.

4. An optical system as defined in claim 3, further comprising positively refracting third spherical lens means focused upon said photodetector in said path.

5. An optical system as defined in claim 4, further comprising a flat transparent plate disposed in front of said end face and separated from said fiber by a film of refractive-index-matching liquid for preventing any focusing of light rays reflected at said end face upon said photodetector.

6. An optical system as defined in claim 3 wherein said semireflecting means comprises a prism with a cemented surface inclined to said axis.

7. An optical system as defined in claim 6 wherein said source is a laser emitting light predominantly polarized in one plane, said prism being of a polarization-sensitive type transmitting light rays polarized in said one plane while reflecting light rays polarized in another plane orthogonal to said one plane.

8. An optical system as defined in claim 1 or 2 wherein said area is an end face of an optical fiber, said magnification ratios in planes parallel to said minor and major sides having respective magnitudes resulting in a beam incident upon said end face whose angular width in both said planes closely approaches the acceptance angle of said fiber.

* * * * *